United States Patent Office 2,747,998
Patented May 29, 1956

2,747,998

GELATION OF SOLUBLE POLYMERS WITH ATTACHED AMINO GROUPS

Edward Val Sayre, Bellport, N. Y., assignor to Eastman Kodak Company, Rochester, N. Y., a corporation of New Jersey No Drawing. Application August 12, 1952, Serial No. 303,997

2 Claims. (Cl. 95—7)

This invention pertains to a method for gelling a polymeric composition obtained by modifying a hydroxyl-containing polyvinyl resin, such as polyvinyl alcohol or a substantially hydrolyzed polyvinyl acetate, by treatment with an amino acetal the result apparently being the introduction of substituent amino groups attached to the polyvinyl compound through cyclic acetal linkages. Gelling is accomplished by treating with formaldehyde or an aldehyde of the lower aliphatic series in the vapor phase.

It is known that polyvinyl acetate may be hydrolyzed to polyvinyl alcohol which is useful as an intermediate in forming various polyvinyl resins. Some of these resins have gelatin-like qualities and may be substituted for gelatin as a carrier for light-sensitive silver salts and the like in photographic film. One of these resins, which has an affinity for acid dye stuffs, can be formed by the action of a halogen alkylamine, for example, bromethylamine, on polyvinyl alcohol. Another which can be used to provide photographic elements with layers composed of gelled hydroxyl polymer compounds is produced by treating polyvinyl alcohol with an aqueous solution containing an acylacetamide. Recently it has been found by W. J. Priest and C. F. H. Allen, as described in pending application Serial No. 303,996, filed August 12, 1952, that a new and valuable resinous polymer is formed by modifying a hydroxyl-containing polyvinyl resin, such as polyvinyl alcohol or a substantially hydrolyzed polyvinyl acetate, by treatment with an amino acetal, which apparently results in the introduction of substituent amino groups. By amino acetal is meant an acetal formed by the reaction of an amino aldehyde with an alcohol. The amino groups are thought to be attached to the polyvinyl alcohol through cyclic acetal linkages.

As a convenience in the manufacture of photographic film, it is desirable that the emulsion-bearing vehicle be capable of being solidified rapidly following coating on a base support. With gelatin this is accomplished through thermally reversible gelation induced by chilling. Polyvinyl alcohol is also gelled through such a temperature-reversible cycle when mixed with gelling agents of the hydroxy aromatic (U. S. Patent 2,286,265) or degraded protein (U. S. Patent 2,522,771) type. It is also the practice to gel polyvinyl alcohol through chemically, rather than thermally, induced cross linking. Slightly acidic polyvinyl alcohol solution layers containing borate are gelled upon passing into an atmosphere of ammonia (U. S. Patent 2,376,371); and slightly alkaline polyvinyl alcohol solution layers are gelled upon being spread on top of a slightly acidic borate-containing layer (U. S. Patent 2,534,326).

Gelatin has also been hardened by the use of formaldehyde or any compound or material capable of liberating formaldehyde or an additive or derivative compound or polymer of formaldehyde, capable of being dissolved to form a hardening solution. Examples of such compounds are formaldehyde bisulfite, hexamethylene tetramine, trioxymethylene, paraform, paraformaldehyde, and polyoxymethylene. If the gelatin hardening solution was to be compounded for immediate use rather than being packaged for future use, liquid hardening agents, such as acetyl benzoyl, acetyl caproyl, diacetyl, dibenzoyl, acetaldehyde, 2,3-butanedione, dichloroacetone, diketobutane, dimethyl diketone, dimethyl glyoxal, formylacrylic acid, furfural, glyceryl aldehyde, glycol aldehyde, glyoxylic acid, hydrofuramide, monochloroacetone, paraoxybenzoyl carbinol, or tartaric dialdehyde have been employed.

The advent of a new polymer comprising a hydroxyl-containing polyvinyl resin which has been treated with an amino acetal, however, presented anew the problem of gelation and hardening. The inventors of the resin, accordingly, determined that adding formaldehyde to the new resin would result in gelation. However, when mixtures of the new resin and formaldehyde were coated in thin films, the films, while useful for many purposes, were not found to be even enough to satisfy certain highly critical requirements sometimes necessary in photographic applications, for instance as a carrier for light sensitive material in color films. By the present invention, I have provided a means for hardening these coated films so that the films would be sufficiently smooth and even to satisfy highly critical requirements. I have discovered that this new polymer can be gelled satisfactorily with the desired smoothness and evenness at a pH above 7 using vapors of formaldehyde. It is also possible to use the vapors of other aldehydes of the lower aliphatic series.

It is, accordingly, an object of my invention to provide a new process for treating with an aldehyde vapor a hydroxyl-containing polyvinyl resin, such as polyvinyl alcohol or hydrolyzed polyvinyl acetate, which has been treated with an amino acetal. Another object is to provide a new photographic element comprising a gel made up of amino acetal-treated polyvinyl alcohol or hydrolyzed polyvinyl acetate hardened by treatment with a lower aliphatic aldehyde vapor, such as the vapor of formaldehyde, and carrying a light-sensitive substance. A further object of the invention is to provide a gelatin substitute which may be used in the photographic and other arts, as for making a photographic emulsion containing light-sensitive material, such as silver salts. Another object of the invention is to provide a tough, clear, transparent film which may be readily hardened or rendered less water susceptible.

The new class of polymers referred to above is prepared by modifying a hydroxyl-containing polyvinyl resin, such as polyvinyl alcohol or a substantially hydrolyzed polyvinyl acetate, by treatment with an amino acetal, which apparently results in the introduction of substituent amino groups. Reaction is preferably carried out in water under acid conditions where all of the components are water soluble. In practice, the reaction is employed in such a way that only a relatively few of the hydroxyl groups and the polyvinyl alcohol groups are converted by reaction with the amino acetal.

One of the amino acetals which may be employed in preparing the new polymer referred to is $\beta$-amino diethyl acetal, but this is merely representative of the class of such compounds which are useful in the formation of these polymers.

In accordance with my invention, layers of aqueous solutions of polyvinyl alcohol possessing a few terminal amino acetal groups are gelled firmly and rapidly by passing a neutral or slightly alkaline layer of polymer solution into fumes of formaldehyde. I have also discovered that by modifying the polymer so that it presents occasional primary amino groups and treating the modified polymer at pH 7 or above with the vapor of an aldehyde of the lower aliphatic series, a hard film is formed. The gel so formed disperses in water only at temperatures above 95° C. When dry this gel forms an insoluble film which exhibits 46% lateral swell and 236% total swell in water at room temperature. In more acid solution the gel formation disappears, there remaining only a soft gel at pH 6, and almost no gelation at pH 5.

The following example shows in an illustrative sense one embodiment of the process for formation of the new polymer described above.

*Modification of polyvinyl alcohol by β-amino diethyl acetal*

Seventeen parts of polyvinyl alcohol made from polyvinyl acetate having a viscosity of 22 centipoises/molar solution with benzene were dissolved in 158 parts water. To this were added 175 parts 1-normal hydrochloric acid, and 5.26 parts β-amino diethyl acetal. After withdrawal of a portion of the reaction mixture as a control, the balance was heated at 58° C. Amino nitrogen content as found by titration increased as heating time increased. Heating for as little as two hours provides a substantial amino nitrogen content.

The following examples are given merely in an illustrative sense to show the advantage of the formaldehyde vapor application over treatment with liquid formaldehyde or incorporation of a hardening material into the coating compound prior to deposition.

*Example 1.*—100 ml. of 5% aqueous solution of the modified polymer containing a polyvinyl alcohol with 3.5 mol percent of its hydroxyl groups bonded through acetal links to amino acetaldehyde were mixed with 1 ml. of 40% formalin, and its pH adjusted to 5. A 6 mil layer of this solution was spread by a Bird Film Applicator onto a surface-hydrolyzed cellulose acetate sheet which had been soaked for a few minutes in 1 percent sodium hydroxide, then drained and dried. The polymer layer gelled firmly within 10 seconds. When dried this film did not strip or dissolve from its support upon soaking in room temperature or in boiling water.

*Example 2.*—The solution of Example 1 was spread in a 6 mil layer on a surface-hydrolyzed cellulose acetate sheet which had been soaked for a few minutes in a 5 percent solution of sodium hydroxide in 1:1 water—3A alcohol, drained and dried. The solution set to a firm gel within 5 seconds. The dried film, however, exhibited wet stripping in cold water.

The procedures of depositing layers of the solution of Examples 1 and 2 onto a sheet still moist with alkali solution resulted in layers which were somewhat uneven as compared to those obtained by the method shown by Example 3, following. Careful examination of the resulting hardened coatings from Examples 1 and 2 reveals that these layers are suitable in many applications wherein highly critical evenness is not required, for instance, in the manufacture of filters and the like. The solution of Examples 1 and 2, when spread in a thin film on a surface not treated with an alkali and then placed in a closed container above concentrated ammonium hydroxide solution, did not gel even after one-half hour.

From the unsatisfactory results obtained in attempting to harden the films coated from solutions of Examples 1 and 2 by exposure to ammonia fumes, it would be concluded that a vapor treatment of such films would be unsatisfactory. Therefore, it was totally unexpected to discover, as disclosed in Example 3 below, that a vapor treatment with formaldehyde hardens the new polymers quite satisfactorily, and with even better results than the hardening of Examples 1 and 2.

*Example 3.*—A 5 percent aqueous solution of the above polymer, described in Example 1, was adjusted to pH 8 and spread in a 6 mil layer on a surface-hydrolyzed cellulose acetate sheet. The coated sheet was placed in a closed container above some 40 percent formalin. The formaldehyde vapor gelled the layer within 1 minute. A very even, tough, smooth film resulted.

The polyvinyl resins, prepared in accordance with my invention, as illustrated by Example 3, are valuable substitutes for gelatin and the production of photographic emulsions and films. Tough, even, films can be provided which are useful, for example, as carriers for light-sensitive materials, such as silver salts. Gelatin used widely in the prior art for this purpose is obtained from animal matter and is subject to variation in its chemical composition. Consequently great care and expense must be invested to purify gelatin used in the photographic art as in emulsions to avoid deleterious effects on the light-sensitive materials used therewith. Use of the compositions herein described provides greater control over the carrier of the light-sensitive material and enables production of film at a lower cost. An extra advantage of these gelling procedures, when properly carried out, is that the resulting film is already hardened in a tightly bound, but easily obtained, support. Also, it has been found that this polymer is compatible with lower pH gelatin. Such mixtures will dry to give clear films. A further advantage of the vapor treatment is the convenience of the treatment, making it relatively easy to pass films through aldehyde fumes in a continuous process, for instance, as part of a conveyor type system. Also, the vapors act directly on the surface of the coating where the hardness is desired, namely the exposed or outer surface. For these reasons my invention has great utility and special advantage in the photographic industry. However, it also provides resins useful in other arts requiring substances having the properties of my hardened modified polyvinyl polymers.

It should be noted that in the above description of the process the three terms—setting, gelling and hardening—are used in many instances to express substantial equivalence in meaning with respect to this process.

I claim as my invention:

1. A photographic element comprising polyvinyl alcohol modified by reacting with the β-amino diethyl acetal, hardened by exposure to vapors of formaldehyde, and containing a light-sensitive silver halide salt.

2. A process for forming a photographic element comprising modifying polyvinyl alcohol by dissolving the polyvinyl alcohol in water, adjusting this solution to a pH of about 0.7 by the addition of hydrochloric acid, subjecting the solution to prolonged heating with β-amino diethyl acetal at a temperature below about 100° C., placing the modified polyvinyl alcohol in a closed container exposed to the vapors of formaldehyde, and adding to the resulting modified polyvinyl alcohol light-sensitive silver halide salts.

References Cited in the file of this patent

UNITED STATES PATENTS

| 2,176,859 | Morrison et al. | Oct. 17, 1939 |
| 2,265,283 | Herrmann et al. | Dec. 9, 1941 |
| 2,276,332 | Lowe | Mar. 17, 1942 |
| 2,310,943 | Dorough et al. | Feb. 6, 1943 |

FOREIGN PATENTS

| 526,497 | Germany | Sept. 25, 1933 |
| 509,012 | Great Britain | July 6, 1939 |